(12) United States Patent
Callegari

(10) Patent No.: US 7,991,600 B2
(45) Date of Patent: *Aug. 2, 2011

(54) VOLUME BODY RENDERER

(75) Inventor: Andres C. Callegari, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 119 days.

This patent is subject to a terminal disclaimer.

(21) Appl. No.: 12/176,075

(22) Filed: Jul. 18, 2008

(65) Prior Publication Data

US 2008/0297510 A1    Dec. 4, 2008

Related U.S. Application Data

(63) Continuation of application No. 10/124,778, filed on Apr. 17, 2002, now Pat. No. 7,412,363.

(60) Provisional application No. 60/284,716, filed on Apr. 18, 2001.

(51) Int. Cl.
G06G 7/48    (2006.01)

(52) U.S. Cl. ............................... 703/10; 703/6; 345/424

(58) Field of Classification Search .................. 345/423, 345/424; 382/109; 703/10, 6
See application file for complete search history.

(56) References Cited

U.S. PATENT DOCUMENTS

| | | | |
|---|---|---|---|
| 4,710,876 A * | 12/1987 | Cline et al. | ................... 345/423 |
| 4,719,585 A | 1/1988 | Cline et al. | |
| 4,751,643 A | 6/1988 | Lorensen et al. | |
| 4,835,712 A | 5/1989 | Drebin et al. | |
| 4,985,856 A | 1/1991 | Kaufman et al. | |
| 5,150,457 A | 9/1992 | Behm et al. | |
| 5,166,876 A | 11/1992 | Cline et al. | |
| 5,179,598 A | 1/1993 | DiFoggio et al. | |
| 5,230,040 A | 7/1993 | Yamashita | |
| 5,253,171 A | 10/1993 | Hsiao et al. | |

(Continued)

FOREIGN PATENT DOCUMENTS

WO    WO 00/14574    3/2000

OTHER PUBLICATIONS

Shiaofen Fang et al., "Volumetric-CSG—A Model-Based Volume Visualization Approach", 1998, Proceedings fo the 6th International Conference in Central Europe on Computer Graphics and Visualization, pp. 1-8.*
Tong-Yee Lee et al., "Interactive Voxel Surface Rendering in Medical Applications", 1999, Elsevier Science Ltd., pp. 193-200.*
European Patent Office; Office Action Pursuant to Art. 94(3) EPO; Mar. 18, 2009, pp. 1-5.
International Search Report and Written Opinion (PCT/US05/36048); Mar. 14, 2008; 13 pgs.

(Continued)

*Primary Examiner* — Jason Proctor
(74) *Attorney, Agent, or Firm* — Crain Caton & James

(57) ABSTRACT

Irregular volumes within one or more three-dimensional volume datasets are identified and extracted in response to criteria. The processing involves automatically finding a seed voxel or seed cell that meets the criteria and thus belongs to an irregular volume of interest, and then identifying cells related to the seed cell by one or more predetermined relationships that are therefore also to be grouped into that irregular volume. Information, which can be of any suitable type, identifying each such cell as being related to other cells and belonging to an irregular volume is stored in a suitable data structure. The location or similar neighborhood information and other data describing properties or attributes of the identified cell are also stored. Because the irregular volumes are extracted and pre-processed in this manner, operations including rendering them on a display and performing Boolean and arithmetic operations on them can readily be performed.

16 Claims, 11 Drawing Sheets

U.S. PATENT DOCUMENTS

| | | | |
|---|---|---|---|
| 5,278,678 A | 1/1994 | Harrington |
| 5,319,777 A | 6/1994 | Perez |
| 5,361,385 A | 11/1994 | Bakalash |
| 5,381,518 A | 1/1995 | Drebin et al. |
| 5,383,114 A | 1/1995 | Chambers |
| 5,398,308 A | 3/1995 | Kato et al. |
| 5,454,371 A | 10/1995 | Fenster et al. |
| 5,544,283 A | 8/1996 | Kaufman et al. |
| 5,548,694 A | 8/1996 | Frisken |
| 5,555,352 A | 9/1996 | Lucas |
| 5,557,711 A | 9/1996 | Malzbender |
| 5,570,460 A | 10/1996 | Ramanujam |
| 5,586,082 A | 12/1996 | Anderson et al. |
| 5,630,034 A | 5/1997 | Okawa et al. |
| 5,671,136 A | 9/1997 | Willhoit |
| 5,742,293 A | 4/1998 | Koyamada et al. |
| 5,769,789 A | 6/1998 | Wang et al. |
| 5,781,194 A | 7/1998 | Ponomarev et al. |
| 5,782,762 A | 7/1998 | Vining |
| 5,798,982 A | 8/1998 | He et al. |
| 5,799,099 A | 8/1998 | Wang et al. |
| 5,842,473 A | 12/1998 | Fenster et al. |
| 5,956,041 A | 9/1999 | Koyamada et al. |
| 5,958,012 A | 9/1999 | Battat et al. |
| 5,963,212 A | 10/1999 | Bakalash |
| 5,966,672 A | 10/1999 | Knupp |
| 5,986,662 A | 11/1999 | Argiro et al. |
| 6,008,813 A | 12/1999 | Lauer et al. |
| 6,012,018 A | 1/2000 | Hornbuckle |
| 6,018,497 A | 1/2000 | Gunasekera |
| 6,026,143 A | 2/2000 | Simanovsky et al. |
| 6,052,477 A | 4/2000 | Wang et al. |
| 6,067,366 A | 5/2000 | Simanovsky et al. |
| 6,076,400 A | 6/2000 | Bechwati et al. |
| 6,078,869 A | 6/2000 | Gunasekera |
| 6,084,989 A | 7/2000 | Eppier |
| 6,108,446 A | 8/2000 | Hoshen |
| 6,115,048 A | 9/2000 | Cline et al. |
| 6,128,365 A | 10/2000 | Bechwati et al. |
| 6,134,564 A | 10/2000 | Listou |
| 6,138,076 A | 10/2000 | Graf et al. |
| 6,188,403 B1 | 2/2001 | Sacerdoti et al. |
| 6,191,787 B1 | 2/2001 | Lu et al. |
| 6,195,444 B1 | 2/2001 | Simanovsky et al. |
| 6,219,059 B1 | 4/2001 | Argiro |
| 6,226,596 B1 | 5/2001 | Gao |
| 6,246,784 B1 | 6/2001 | Summers et al. |
| 6,262,734 B1 | 7/2001 | Ishikawa |
| 6,304,266 B1 | 10/2001 | Li |
| 6,307,573 B1 | 10/2001 | Barros |
| 6,331,116 B1 | 12/2001 | Kaufman et al. |
| 6,343,936 B1 | 2/2002 | Kaufman et al. |
| 6,466,239 B2 | 10/2002 | Ishikawa |
| 6,647,432 B1 | 11/2003 | Ahmed et al. |
| 6,650,339 B1 | 11/2003 | Silva et al. |
| 6,674,894 B1 | 1/2004 | Parker et al. |
| 6,707,454 B1 | 3/2004 | Barg et al. |
| 6,765,570 B1 | 7/2004 | Cheung et al. |
| 6,766,255 B2 | 7/2004 | Stone |
| 6,771,262 B2 | 8/2004 | Krishnan |
| 6,915,301 B2 | 7/2005 | Hirsch |
| 6,940,507 B2 | 9/2005 | Repin et al. |
| 7,046,246 B2 | 5/2006 | Saitou |

OTHER PUBLICATIONS

Tsai, Ming-Dar, Jou, Shyan-Bin and Hieh, Ming-Shium; Volume Based Cutting Force Simulation for Musculoskeletal Surgery; The Tenth International Conference of Artificial Reality and Tele-Existence; 2000; pp. 132-139; XP007902446; Chia-yi; Taiwan, R.O.C.

Lee, T.Y., Weng, T.L., Lin, C.H. & Sun, Y.N.; Interactive Voxel Surface Rendering in Medical Applications; Elsevier Science Ltd.; Computerized Medical Imaging and Graphics 23; 1999; pp. 193-200.

Kindlmann, Gordon Lothar; Semi-Automatic Generation of Transfer Functions for Direct Volume Rendering; Thesis Presented to Cornell University; Jan.1999, pp. 1-134.

Sutton,Philip M.;Hansen,Charles D.;Shen,Han-Wei;Schikore,Dan;A Case Study of Isosurface Extraction Algorithm Performance;U. of Utah,Ohio State U. & L. Livermore Labs; Dec. 14, 1999; pp. 1-11.

Lakshmipathy,J;Nowinski,W.L.;Wernert,E.A.;A Novel Approach to Extract Triangle Strips for Iso-Surfaces in Volumes;Indiana U.;Institute for Infocomm Research(Singapore); 2004; pp. 1-7.

Sheffield, Tatum M. et al.; Geovolume Visualization Interpretation; Color in 3-D Volumes; The Leading Edge; Jun. 1999; pp. 668-674.

Hohne, Karl Heinz et al.; Voxel-Based Volume Visualization Techniques; Inst. of Mathematics and Computer Sci. in Medicine Univ. Hosp.; Eppendorf; Univ. of Hamburg; 1990; pp. 66-83.

Silva, C.T.; Fast Rendering of Irregular Grids; 1996 Symposium on Volume Visualization; Oct. 28-29, 1996; pp. 15-22.

Silva, C.T.; PVR High-Performance Volume Rendering; Computational Science and Eng.; IEEE (See also Computing in Science & Eng.); vol. 3, Issue 4; Winter 1996; pp. 18-28.

Wikipedia, Rendering (computer graphics); retrieved from www.wikipedia.org on Dec. 6, 2007; 11 pages.

Wikipedia, "Z-buffering";retrieved from www.wikipedia.org on Dec. 6, 2007; 3 pages.

Wikipedia, "Painter's algorithm"; retrieved from www.wikipedia.org on Dec. 6, 2007; 2 pages.

Carlbom, Ingrid, Chakravarty, Indranil & Hsu, William M.; SIGGRAPH '91 Workshop Report; 1992; Computer Graphics; vol. 26 No. 1; pp. 8-16.

Dorn G.A.; "Modern 3-D Seismic Interpretation," Leading Edge, The Society of Exploration Geophysicists, Sep. 1998, pp. 1262-1264, 1266, vol. 17, No. 9, Tulsa, Oklahoma, US.

Gerhardt, A., et al.; "A Combined Approach to 3D Seismic Data Segmentation and Rendering," 6th International Congress of the Brazilian Geophyscial Society, [online] 1999, Retrieved from the Internet: URL: http://www.tecgraf.puc-rio.br/publications/artigo_1999_combined_approach_3d_seismic.pdf> [retrieved on Mar. 14, 2007], pp. 1-4, *sec. "Volume rendering", "Region growing" and "Integrating both methods"* Rio de Janeiro, Brazil.

Mueller, et al.; "Anti_Aliased Three-Dimensional Cone-Beam Reconstruction of Low-Contrast Objects with Alebraic Methods," IEEE Transactions on Medical Imaging, Jun. 1999, pp. 519-537, vol. 18, Issue 6.

Response to EPO Office Action dated Mar. 18 2009; May 15, 2009; pp. 1-8.

International Preliminary Examining Authority; PCT Written Opinion, PCT/US2002/012160; 4 pages; Sep. 9, 2003.

International Preliminary Examining Authority; PCT International Preliminary Examination Report, PCT/US2002/012160; 4 pages; Dec. 29, 2003.

International Searching Authority; PCT International Search Report and Written Opinion, PCT/US2005/036048; 13 pages; Mar. 14, 2008.

International Searching Authority; PCT International Preliminary Report on Patentability, PCT/US2005/036048; 10 pages; Oct. 9, 2008.

European Patent Office; Office Action Pursuant to Art. 94(3) EPO Application No. 02 725 716.1; Jun. 1, 2010, pp. 1-5.

Gargantini, I.; Schrack, G.; Atkinson, H. H.; Adaptive Display of Linear Octrees; Computers & Graphics vol. 13, No. 3, pp. 337-343, 1989.

Robert A. Drebin, Loren Carpenter, Pat Hanraham, "Volume Rendering," Computer Graphics, Aug. 1988, pp. 65-74 (10 pages), vol. 22, No. 4, ACM.

T. Todd Elvins, "A Survey of Algorithms for Volume Visualization," Computer Graphics, Aug. 1992, pp. 194-201 (8 pages), vol. 26, No. 3, ACM.

T.-Y. Lee, T. -L. Weng, C, -H. Lin, Y.-N. Sun, "Interactive voxel surface rendering in medical applications," Computerized Medical Imaging and Graphics, 1999, pp. 193-200 (8 pages), 23, Elsevier Science Ltd.

Jennifer L. Guerra, Office action of Oct. 5, 2010 regarding Canadian Appl. 2,443,110, Oct. 5, 2010, 3 pages, Canadian Intellectual Property Office, Canada.

* cited by examiner

VOLUME BODY RENDERER

CROSS REFERENCE TO RELATED APPLICATIONS

The priority of U.S. Patent Application No. 60/284,716, filed on Apr. 18, 2001, and U.S. patent application Ser. No. 10/124,778, filed on Apr. 17, 2002, are hereby claimed, and the specifications thereof incorporated herein in their entirety by this reference.

BACKGROUND OF THE INVENTION

1. Field of the Invention

The present invention relates generally to processing, model extraction, model refinement and graphical rendering of digital data representing geologic or other types of volumes and, more specifically, to rendering and analysis of irregularly shaped volumes within voxel-based volumetric data.

2. Description of the Related Art

Geologists, geophysicists and others analyze seismic data for purposes such as detecting the presence and change over time of hydrocarbon reservoirs or other subsurface features. Seismic data can be gathered by, for example, creating explosions or otherwise releasing energy into the ground, and detecting and digitizing the reflected seismic energy using an array of geophones or similar sensors. The processed volumetric seismic data represent a three-dimensional (3D) subsurface region, typically expressed in time or depth units. Other examples of ways in which such volumetric data can be gathered and used include gravitational and magnetic measurement. The data can comprise any of a large number of attributes that practitioners in the art have identified as being usable or derivable from reflected seismic energy and field measurements, the most common of which perhaps being amplitude of the reflected signals.

Collected 3D or volume datasets can be interpreted, stored and otherwise manipulated in any of a number of formats. An increasingly common format is that in which each data element itself represents a volume. Such a data element is known as a voxel (for "volume element") or cell. If, for example, amplitude is the attribute that characterizes the collected data, the attribute samples are represented by voxels, each characterized by an amplitude. In other words, the dataset is made up of a multiplicity of voxels, each characterized by an amplitude. A property of such cells may be characterized as a data-collection attribute, from which the volume dataset was constructed, such that the attribute data includes at least one value of the data-collection attribute of the identified cell. A seismic volume dataset commonly comprises millions or even billions of voxels and can require terabytes of data storage. Voxel formats are commonly used not only in seismic data analysis but also in medical imaging and other imaging disciplines.

The analysis of volumetric data typically involves rendering, interpreting, and refining stages to produce a sub-surface model or to render a specific 3D view of the sub-surface region. Most commercially available 3D graphics engines (e.g., graphics accelerator cards for workstation computers) do not have voxel primitives; rather, they can interpret only points, lines, and polygons such as triangles, because they are intended for rendering surface-based representations of 3D objects, i.e., hollow shells, not objects comprising voxels. Although some voxel-based graphics accelerators exist, they cannot efficiently and cost-effectively combine 2D and 3D primitives, which are needed to implement certain display features, such as spherical bill-boarding and animation.

Thus, the known methods for rendering voxel data, such as raycasting and splatting, merely produce snapshot 3D images from some predetermined viewing perspective. In raycasting, rays are projected from the viewer's origin, the user's point of view, or through a projection plane and extended until they intersect a data point or a series of data points. These point(s) along and around the rays are processed and the resulting image drawn on the display or projection plane. In splatting, the contribution to the final image of each voxel around a predetermined neighborhood is computed. Voxels are conceptually or virtually "thrown" onto the image plane such that each voxel in the object space leaves a footprint in the image space. Whether used to render surface-based representations of three-dimensional objects or actual, i.e., voxel-based, three-dimensional objects, these methods can render only flat voxel approximation, i.e., circular or square in shape with no defined voxel neighborhood, and are strictly view-dependent. Also note that all of the known voxel data rendering methods are computationally software or hardware resource intensive and require expensive and specialized hardware that possesses various performance and viewing limitations. In addition, the performance of many of these algorithms is affected by how they traverse memory. When memory is traversed in different directions, the algorithm performance can vary depending upon hardware data access efficiency. The bigger the working data volume the lesser the ability to efficiently use hardware caches.

Furthermore, regardless of which of the various voxel rendering methods is used, the entire volume dataset must be retained in (hardware) memory and eventually rendered by the 3D graphics hardware. To render a data volume, the entire dataset must be retrieved/swapped from data storage (i.e., random access memory, disk memory, etc.) and rendered using computationally intensive algorithms and sent to normally resource-limited 3D graphics hardware. As a result of these limitations, rendering can take a substantial amount of time, depending upon the hardware used. Rendering quality, interactive high-end display options and interactive display response are of considerable concern to persons such as geologists and geophysicists who may wish to view a model from many different directions or viewpoints, compare different models to each other, and otherwise manipulate them in their analysis of subsurface features relating to oil and gas reservoirs.

It is commonly desirable to identify, isolate, and focus upon specific features and/or anomaly regions within a volume, such as those relating to potential oil and gas reservoirs in seismic volumes or those relating to organs, bones and tumors in medical volumes. Such features can be referred to as irregular volumes because they do not have a regular or predictable shape. Raycasting, point splatting and even newer pure voxel rendering schemes cannot readily separate or otherwise work with such irregular volumes separately from the whole working data volume, because in most cases (i.e., when using hardware 3D or 2D texturing) the whole working data volume is eventually sent and completely rendered by the 3D graphics hardware. The image created by the 3D hardware may graphically and partially isolate certain features on the screen, but that is little more than an ephemeral or snapshot view of the data volume from a single specific direction. That is, even though a user may see a feature in the image, the feature is not represented separately within the computer logic apart from the neighboring data. It may be, however, that a user is interested in only a specific irregular volume or group of irregular volumes and not in the volume as a whole, or may be interested in performing some specific attribute mapping operation or view upon only a specific irregular volume or set of irregular volumes. For example, one may wish to consider a series of images, each representing the same irregular volume or group of irregular volumes at a different time, to assess how the irregular volume(s) may have changed over time as, for example, oil or gas is depleted. Conventional rendering systems require one to render each volume dataset in its entirety to see how the irregular volume of interest represented within it appeared at the time the dataset was collected.

Practitioners in the art have attempted to overcome the inability to work with individual irregular volumes by laboriously identifying them using the snapshot views, and extracting each of them from volume datasets. This process can be very painful and tedious if there is a lot of noise in the data or if the objects are numerous and small in size. For example, algorithms have been suggested by which one, using various snapshot views from various angles, visually identifies a seed point or seed voxel belonging to an irregular volume and then uses separate custom-written software to extract all of the mutually neighboring voxels that are presumed to belong to the same irregular volume. Nevertheless, it becomes inefficient, laborious and time-consuming to use such a process and workflow to identify a large number of irregular volumes. The problem is greatly magnified if one is interested in identifying all of the irregular volumes in a very large dataset. Moreover, no practical and efficient means for further manipulating or analyzing irregular volumes extracted in this manner have been suggested.

It would be desirable to provide an efficient system for identifying, rendering and otherwise working with individual irregular volumes represented within one or more volume datasets. The present invention addresses these problems and deficiencies and others in the manner described below.

SUMMARY OF THE INVENTION

In one embodiment, the present invention includes a computer-implemented method for identifying irregular volumes represented within volumetric input data, comprising the steps of: i) inputting one or more volume datasets comprising a multiplicity of three-dimensional cells; ii) establishing criteria describing properties of an irregular volume of interest; iii) processing each volume dataset, the processing comprising the steps of: a) traversing from cell to cell of the volume dataset until a seed cell is identified having properties matching the criteria, the identified seed cell thereby belonging to an identified irregular volume; b) identifying cells related to the seed cell by a predetermined relationship as belonging to the identified irregular volume; and c) storing in a data structure associated with each identified cell belonging to the identified irregular volume, attribute data describing properties of the identified cell; iv) selecting an identified irregular volume; v) transforming each cell of the irregular volume that is selected into a polyhedral voxel representation, representation including a face string having a plurality of bits, and a position string having a plurality of bits, each bit of the face string corresponding to one face of the polyhedral voxel and having a value indicating whether the face is to be displayed, the position string having a value indicating a three-dimensional spatial position of the polyhedral voxel; and vi) rendering the representation of each polyhedral voxel, the face string for at least one polyhedral voxel representation having a bit with a value indicating at least one face is to be displayed for an internal cell.

In another embodiment, the present invention includes a computer program product for identifying irregular volumes represented within volumetric input data, comprising a computer-usable data medium carrying thereon a i) means for inputting one or more volume datasets comprising a multiplicity of three-dimensional cells; ii) means for establishing criteria describing properties of an irregular volume of interest; iii) means for processing each volume dataset, the processing comprising the steps of: a) traversing from cell to cell of the volume dataset until a seed cell is identified having properties matching the criteria, the identified seed cell thereby belonging to an identified irregular volume; b) identifying cells related to the seed cell by a predetermined relationship as belonging to the identified irregular volume; and c) storing in a data structure associated with each identified cell belonging to the identified irregular volume attribute data describing properties of the identified cell; iv) means for selecting an identified irregular volume; v) means for transforming each cell of the irregular volume that is selected into a polyhedral voxel representation, representation including a face string having a plurality of bits, and a position string having a plurality of bits, each bit of the face string corresponding to one face of the polyhedral voxel and having a value indicating whether the face is to be displayed, the position string having a value indicating a three-dimensional spatial position of the polyhedral voxel; and vi) means for rendering the representation of each polyhedral voxel, the face string for at least one polyhedral voxel representation having a bit with a value indicating at least one face is to be displayed for an internal cell.

In yet another embodiment, the present invention includes a method for voxel-encoding a volume dataset comprising a multiplicity of cells, comprising the steps of: i) defining a multiplicity of polyhedral voxels, each polyhedral voxel corresponding to one cell; ii) storing a representation of each polyhedral voxel, the representation including a face string having a plurality of bits, and a position string having a having a plurality of bits, each bit of the face string corresponding to one face of the polyhedral voxel and having a value indicating whether the face is to be displayed, the position string having a value indicating a three-dimensional spatial position of the polyhedral voxel; and iii) rendering the representation of each polyhedral voxel, the face string for at least one polyhedral voxel representation having a bit with a value indicating at least one face is to be displayed for an internal cell.

In yet another embodiment, the present invention includes a computer program product for voxel-encoding a volume dataset comprising a multiplicity of cells, comprising a computer-usable medium carrying thereon a i) means for defining a multiplicity of polyhedral voxels, each polyhedral voxel coiresponding to one cell; ii) means for storing a representation of each polyhedral voxel, the representation including a face string having a plurality of bits, and a position string having a plurality of bits each bit of the face string corresponding to one face of the polyhedral voxel and having a value indicating whether the face is to be displayed, the position string having a value indicating a three-dimensional spatial position of the polyhedral voxel; and iii) means for rendering the representation of each polyhedral voxel, the face string for at least one polyhedral voxel representation having a bit with a value indicating at least one face is to be displayed for an internal cell.

Additional aspects, advantages and embodiments of the invention will become apparent to those skilled in the art from the following description of the various embodiments and related drawings.

Although the illustrated embodiments of the invention relate to seismic volume data, the present invention is applicable to any suitable volume data, such as that used in medical imaging and other disciplines. It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 3I is a continuation of FIGS. 3A-H.

DETAILED DESCRIPTION

Figure 1:
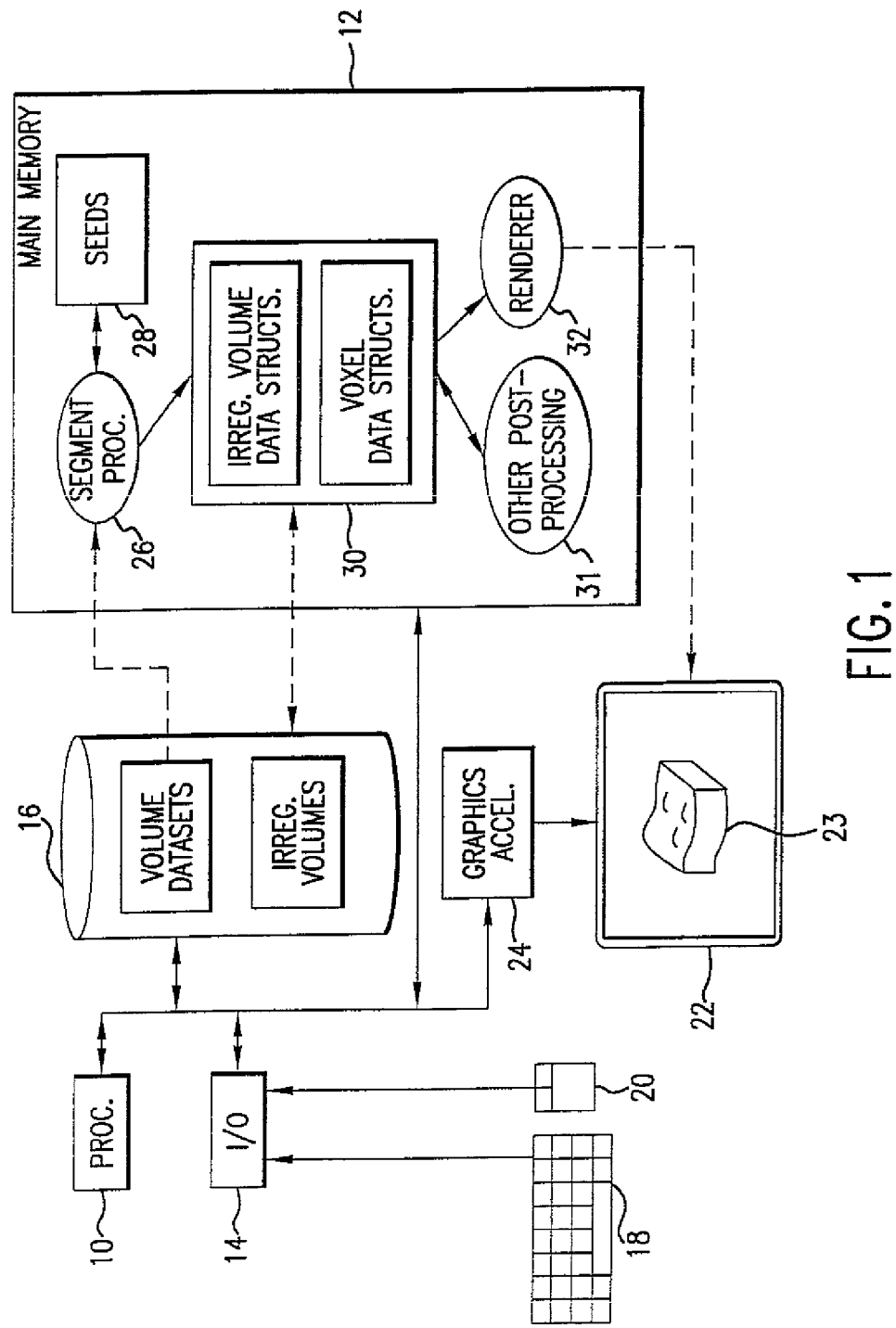
FIG. 1 illustrates a computer system in an exemplary embodiment of the present invention.

A person can use a computer, generally illustrated in FIG. 1, to effect the irregular volume (IV) identification, processing, rendering, and other methods of the present invention. As described below, due to the novel algorithms and methods of the present invention, the computer need not be a powerful graphics workstation of the type conventionally used to render complex three-dimensional datasets, such as that commonly used in subsurface geological analysis; rather, in some embodiments of the invention it can be an ordinary personal computer or even a laptop computer having relatively limited memory, graphics and processing power. A suitable computer has, for example, a processor 10, main memory 12 in which programs and data are stored during operation, input/output control 14, a hard disk 16 or similar device in which programs and data are stored in a non-volatile manner, a keyboard 18, a mouse or similar pointing device 20, and a video monitor or other display device 22 on which IVs 23 can be rendered. A graphics accelerator 24 of the type commonly included in personal computers for facilitating three-dimensional rendering can also be included. As persons skilled in the art to which the invention relates understand, the computer includes other hardware and software elements that are not illustrated for purposes of clarity but that are commonly included in such computers. Although only one processor 10 is illustrated for clarity, there can be multiple central processing units (CPUs), and the system can be multi-piped or clustered such that processing can be performed by multiple CPUs or computers, and the rendering of voxel primitives (described below) can be performed by multiple independent systems or graphics display subsystems.

Depicted as conceptually residing in or stored in memory 12 are the following software elements: a segmentation processor 26; seed data 28; data structures 30; post-processor 31; and a renderer 32. As persons skilled in the art understand, these software elements are depicted as residing in memory 12 for purposes of conceptually illustrating the programmed computer and may not actually reside simultaneously or in their entireties; rather portions of programs and data relating to the present invention will be created, stored, removed and otherwise appear in memory on an as-needed basis primarily under the control of processor 10 in accordance with its programming. Such software elements or portions thereof may be transferred between hard disk 16 and memory 12 on an as-needed basis in the conventional manner familiar to persons skilled in the art. The programming (code) can be stored on hard disk 16, having been loaded from a CD-ROM (not shown) or other removable disk, a remote computer via a network connection (not shown), or other source of computer-executable program code. Segmentation processor 26, post processor 31 and renderer 32 are major elements of the programming; other more conventional elements of the programming, such as a suitable user interface, are not shown for purposes of clarity but would occur readily to persons skilled in the art in view of these teachings. The present invention can thus be embodied not only as a method and system but also as a computer-usable medium or program product on which software elements are stored. As noted above, other software elements reside in memory 12 at some time and in at least in part but are not shown for purposes of clarity including, for example, a suitable operating system, such as MICROSOFT WINDOWS, UNIX or LINUX.

Figure 2:
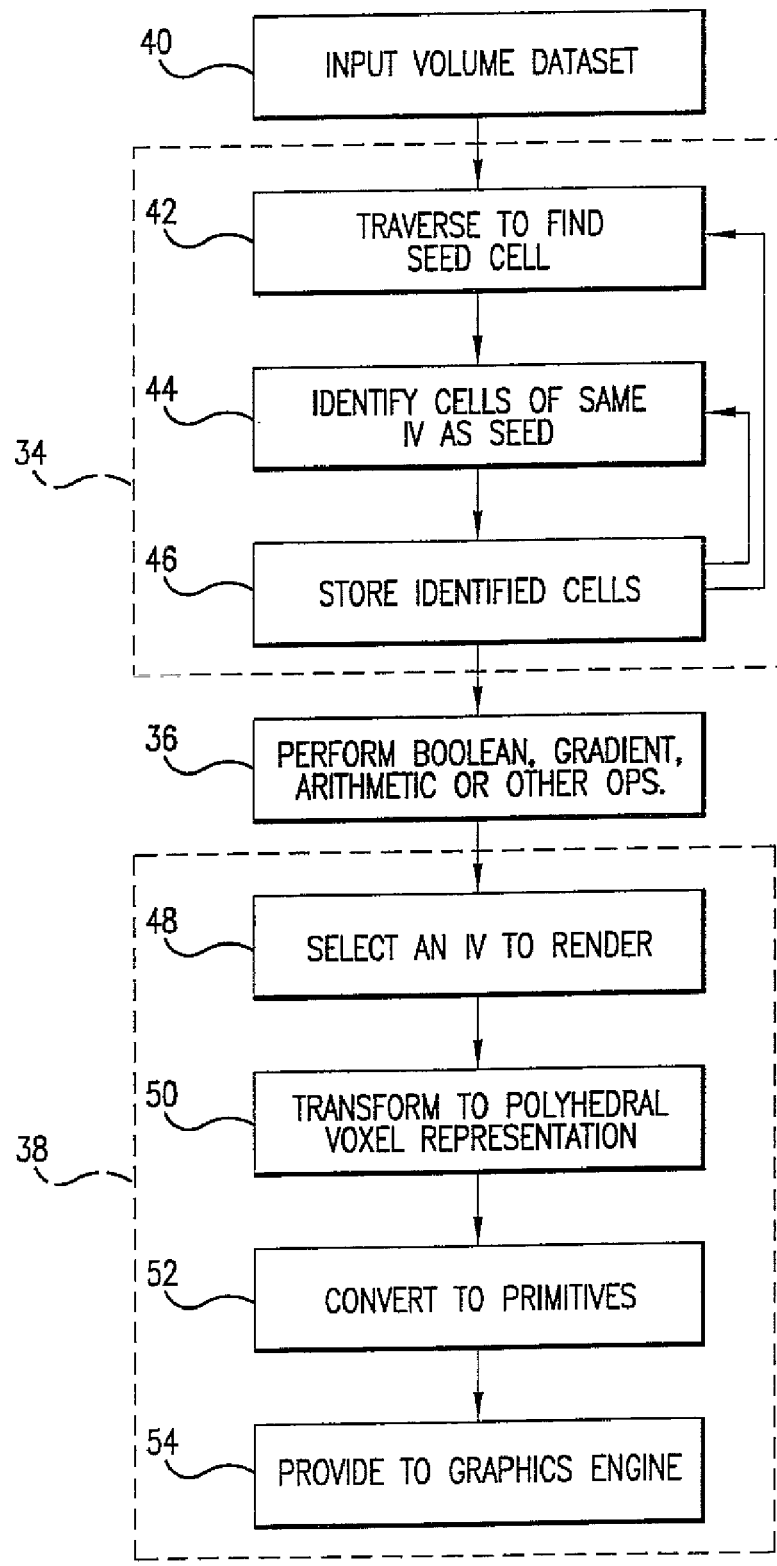
FIG. 2 is a flowchart illustrating a method for identifying and storing irregular volumes and performing rendering and other operations on them.

As illustrated in FIG. 2, the major steps of the method of the present invention include a segmentation or pre-processing step 34, one or more irregular volume (IV) operations 36, and a rendering step 38. Prior to pre-processing step 34, a volume dataset is input at step 40. The volume dataset in the illustrated embodiment of the invention can be of the type commonly used in subsurface geological analysis. Such a dataset typically comprises a large number, often many millions or billions, of datapoints or cells in three-dimensional space, each representing the value of an attribute such as the amplitude of an acoustic signal reflected by subsurface features at a point or cell within a three-dimensional volume. In other words, the dataset represents a subsurface volume. The volume may contain one or more IVs representing hydrocarbon reservoirs or other volumetric features that can be distinguished from the volume as a whole on the basis of the attribute values. As described in further detail below, the present invention can identify any such IVs and store representations of them in data structures in a manner that facilitates efficiently and speedily performing operations on them and rendering them.

Step 40 can also include defining an "extent." That is, a user can select only a portion or subset of a volume dataset to provide to pre-processing step 34. In this manner, under control of the user or an automated algorithm, a volume dataset can be divided into portions or subsets so that only those of interest are processed or so that the various portions can be processed separately from one other. Dividing volume datasets in this manner is especially conducive to multitasking or multiprocessing computing systems in which the processing at step 34 can be performed by multiple threads essentially in parallel with one another; one thread can be processing one portion while another thread is processing another portion.

Pre-processing step 34 comprises a step 42 of traversing the cells of the input volume dataset until a seed cell is found that satisfies certain predetermined criteria of an IV of interest to the user. Then, at step 44 other cells are identified that are related to the seed cell in some predetermined manner. For example, they can be related by adjacency. As described below, step 44 can be performed by a recursive algorithm. Information describing each identified cell is stored in a data structure at step 46. The information can include, for example, attribute value such as amplitude that describe properties of the cell, an indication of the location of the identified cell within the volume dataset as a whole or other frame of reference, and an identifier uniquely identifying the identified cell as belonging to the identified IV. Thus, each such cell is tagged to identify the IV to which it belongs. A cell "belongs" in the sense that it is related to other cells of the IV in some predetermined manner, such as by spatial adjacency (i.e., cells are within a predetermined or selected distance of each other or a reference point or cells are within a predetermined or selected neighborhood), by wavelet characteristics, or by some other attribute or constraint. Steps 42, 44 and 46 are performed until all cells belonging to each IV within the input volume dataset have been identified. Note that more than one volume dataset or section of it can be processed in this manner. The resulting IVs that are identified and stored can thus be those contained within different volumes. For example, it may be desirable to pre-process a plurality of volume datasets representing snapshots of the same subsurface volume at different times so that the IVs within them can be compared to see how features, such as hydrocarbon reservoirs, may have changed over time.

It is at IV operations step 36 that such comparisons and other operations can be performed. For example, to compare two IVs representing snapshots of the same subsurface volume at different times to determine how it changed, one can perform a Boolean AND or intersection operation. Other operations can include a Boolean OR or union operation, arithmetic operations, gradient operations and any other operation known in the art to be performed upon geologic or similar volume data. These operations can be performed very efficiently because the data structures contain all of the necessary information, such as the location of each cell and its attribute values; the original dataset need not be accessed again.

Although gradient operations, for example, are well-understood by persons skilled in the art to which the invention relates, the steps can comprise (in the case where the voxel primitive is, as described below, a hexahedron or cube), determining the normals for each face of the hexahedron and computing the gradient (fnormal) using the well-known central differences method.

The stored IVs or any IVs that result from the operations of step 36 can be displayed at rendering step 38. Any suitable three-dimensional rendering method known in the art can be used. Nevertheless, step 38 can alternatively or in addition comprise a novel rendering method of the present invention that converts or transforms the stored data into voxel (polyhedral) graphics primitives and, in some embodiments of the invention, into simpler (e.g., polygon, point, line) graphics primitives. For example, at step 48 a user can select an IV to render. At step 50 the IV can be transformed into a polyhedral voxel representation. For example, each cell can be represented as a cubic voxel or as cones (to provide a vector cue). The term "voxel" is used in this patent specification to refer to a software representation of a three-dimensional volumetric object that includes information sufficient to render it and perform other processing upon it without resorting to conventional approximate three-dimensional rendering algorithms such as raycasting or texturing schemes. The term "cell" refers to the corresponding raw volumetric object that does not include such rendering information, though it may include attribute information and other information. In the illustrated embodiment of the invention, an exemplary bit string is defined that includes six bits, each indicating the state of one face of the cube. If a bit is "1" the face is to be displayed, i.e., it is "on." If the bit is "0" the face is not to be displayed, i.e., it is "off." Another bit of the string can indicate whether the voxel as a whole is "on" or "off," as it is sometimes desirable to display all faces. Another bit of the string can indicate whether the voxel is selected. Selection refers to the type of operation that a user may perform to select some portion for performing an operation upon. A selected portion of an IV can be displayed, for example, in a different color than non-selected portions. In transforming a cell to a polyhedral voxel primitive, another bit string (e.g., 48 bits) that indicates the location of the voxel can be generated, as can still another string (e.g., 12 bytes) that indicates the normal information. As known in the art, normal information is used by 3D graphics engines to determine proper shading based upon light reflected from the object with respect to the viewpoint and one or more light sources.

In embodiments of the invention in which graphics accelerator 24 accepts voxel primitives as input, the resulting voxel data can be provided directly to graphics accelerator 24 for rendering at step 54. In embodiments in which graphics accelerator 24 accepts only the more conventional primitives, such as points, lines and polygons, each voxel can be transformed into such primitives at step 52. For example, each face of a cube can be divided into two triangles. Triangles are a commonly accepted primitive in many commercially available graphics accelerators 24.

Depopulation can also be performed at step 50. Depopulation refers to a scaling operation that renders the data using fewer voxels when the user's viewpoint is farther away from the image than when the user's viewpoint is closer. In other words, if the view is more distant, a number of voxels can be rendered as a single voxel. Thus, step 50 is responsive to user interface input indicating a distance from the viewpoint to the image. Each cell can be asynchronously depopulated at process/render time because each cell contains position and state information. The depopulation can occur during rendering or processing depending on the desired results. For example, it may be desired to mix multiple attributes in an IV by rendering them at different depopulation locations.

FIGS. 3A-I illustrate pre-processing step 34 of the exemplary embodiment of the invention in further detail. At step 56 the user identifies or selects a volume dataset to work with. The user can also select an extent or portion of the dataset to work with. Thus, the user can selectively partition the dataset into multiple portions and process only some of them or have the computer process them separately, e.g., by multiprocessing. Alternatively to the user partitioning the dataset, it can be divided automatically into some predetermined number of portions.

At step 58, if the user has indicated that a union operation is to be performed between two or more IVs, step 60 is performed. Step 60 is illustrated in further detail in FIG. 3G. As illustrated in FIG. 3G, if it is determined at step 62 that a Boolean volume does not yet exist, one is allocated in memory at step 64. If one exists, it is reset at step 66. At step 68 manager cells are initialized and set. This means that a series of fields of a data structure are tagged to indicate that a Boolean operation is to be performed. Processing returns to step 70 in FIG. 3A.

A recursive structures array is used to reduce the amount of stack memory that might otherwise be needed by the hardware system. That is, every time a recursive function is called, a frame, containing function arguments and other data, is created on the stack. The recursive structures array effectively shifts the memory burden to the heap, where memory is dynamically allocated and deallocated and thus not as limited a resource as the stack. If it is determined at step 70 that that such an array does not yet exist, one is created at step 72.

A bit volume is an object in which its bit elements map one-to-one to each sample or element of the original data volume array. That is, it uses a 1-bit element for each 8, 16, 32, 64, etc., bit sample element. The bit array object can be used to eliminate the need for performing searches or sorting, and provides a structure to maintain traversal state. A count bit volume is used, in conjunction with the original data volume to further remove noise, by keeping a scratch pad on an initial irregular size calculation. It also provides a way to constrain the size of IVs and cells that are to be accepted. It can be used as a mask for non-processing areas, too. The count bit volume works by providing an on/off checking scheme and by eliminating the need for search schemes, which are prohibitive when using large data volumes. This is, because the access is random, the time needed to access a cell is not dependent upon the amount or size of data. If it is determined at step 74 that a count bit volume exists, it is reset at step 76. If one does not exist, one is created at step 78.

A state bit volume is used, in conjunction with the original data volume, to maintain the processing traversal state (to keep track of cells that have been processed so as not to re-process a cell). The state bit volume also aids performing Boolean operations between IVs and processing sets of IVs together from different volume datasets. It is also used to perform merging of various irregular data volume datasets created by sub-dividing the original dataset into smaller datasets to be processed by separate threads or otherwise processed separately. If it is determined at step 80 that a state bit volume exists, it is reset at step 82. If one does not exist, one is created at step 84.

A loop is begun at step 85 in which cell samples from the input volume dataset are processed. Step 86 provides status information, such as whether memory requirements have been exceeded, via the user interface. At step 88 it is determined whether the then-current sample meets predetermined criteria for a seed cell. The sample is deemed to be a seed cell if: (1) the attribute meets predetermined threshold requirements; (2) the state bit is not set in the state volume; (3) the count bit is not set in the count bit volume; (4) the cell to the left of the then-current sample cell is not a valid cell; (5) the cell above the then-current sample cell is not a valid cell; and (6) the cell in front of the then-current sample cell is not a valid cell. Condition (1) means that the attribute is compared to one or more predetermined thresholds. A threshold can be, for example, the value of a single attribute, such as amplitude. For example, it may be desired to ignore any samples that do not have an amplitude above a certain threshold. Condition (2) means that the algorithm has not yet processed this cell, and it thus remains a candidate for identification as a cell for the current IV or as a seed cell for a different IV. If the count bit to which condition (3) relates is set, that means that another search process has already considered this sample as a seed cell candidate and that either the cell was already processed or the IV to which the cell belongs did not meet a predetermined minimum size threshold. (A very small IV can represent noise rather than a subsurface feature in which the user would be interested.) Conditions (4), (5) and (6) refer to the order in which the cells of the input volume dataset are processed: left to right, then top to bottom, then back to front. If the top, left or front cell has already been processed and found to be valid, the then-current sample cell has already been processed and can be discarded as a candidate seed cell. Note that the conditions described above that define the criteria for a seed cell are only exemplary; additional criteria or fewer criteria can be used.

Note that although in the illustrated embodiment of the invention the cells are traversed from one cell to an adjacent cell until a seed is found, the invention is not so limited. In addition to traversing from cell to cell based upon such spatial adjacency, in other embodiments the invention can traverse from cell to cell based upon a stride or neighborhood projection lookup or any other suitable means for traversing from one cell to another (not necessarily spatially adjacent) cell.

If a seed cell is found, then a recursive process is begun at step 90 in which the irregular volume to which the seed cell belongs is assigned a master identifier, and each cell in that IV is identified and added to an IV cell counter field. Information describing each identified cell, such as its location and the identifier identifying the irregular volume to which it belongs, is stored in a data structure corresponding to that cell. The recursive "process IV from seed cell" process is described in further detail below. The process of searching for seed cells and processing the IV to which each identified seed cell belongs is repeated until it is determined at step 92 that all cells in the input volume dataset have been sampled.

Various post-processing operations can readily be performed once the IVs in the input volume have been identified and stored. These operations are essentially those known in the prior art to be of interest to geologists and other users of such a system. For example, union operations and projection operations are well-known. Nevertheless, the pre-processing enables such operations to be performed much more efficiently and rapidly than if conventional algorithms are used to perform them, because there is no need to reprocess entire data volumes and create resulting volumes of equal size. For example, if at step 94 it is determined that the user indicated that a union operation is to be performed, then at step 96 union processing that takes advantage of the pre-processing is performed as described below. If at step 98 it is determined that the user indicated that a projection operation is to be performed, then at step 100 a projection operation that takes advantage of the pre-processing is performed. In conventional systems, raycasting or other complex algorithms are used to perform projection and viewing operations. In the present invention, projection is a straightforward step of which persons skilled in the art to which the invention relates will readily be capable of implementing. A single set of geometric information can be downloaded to the hardware and rendered continuously merely by changing view parameters. Step 102 indicates that any other such well-known operations can be performed prior to download.

For example, an operation that can be performed at step 102 upon an identified IV is minimum or maximum attribute projection-display. The IV is processed so that all cells that have a property that identifies them as skin cells, i.e., cells on the outer voxel skin of the IV, receive a new attribute value. Columns of cells from the IV are processed by determining the number of voxels between the top cell, i.e., the skin cell, and a non-existent cell within the bit volume. The bit volume is marked with all the existing cells. The attribute values of the top cells are then compared with the following continuous existing cells in the column. The maximum or, in other cases, the minimum attribute value, replaces the top cell attribute value. The same operation is performed for the bottom cells. This projection can be performed using a normal or view/projection vector that is provided.

At step 104 housekeeping tasks such as deleting the state bit and count bit volumes and the heap/stack memory resources can be performed before processing terminates.

Figure 3A:
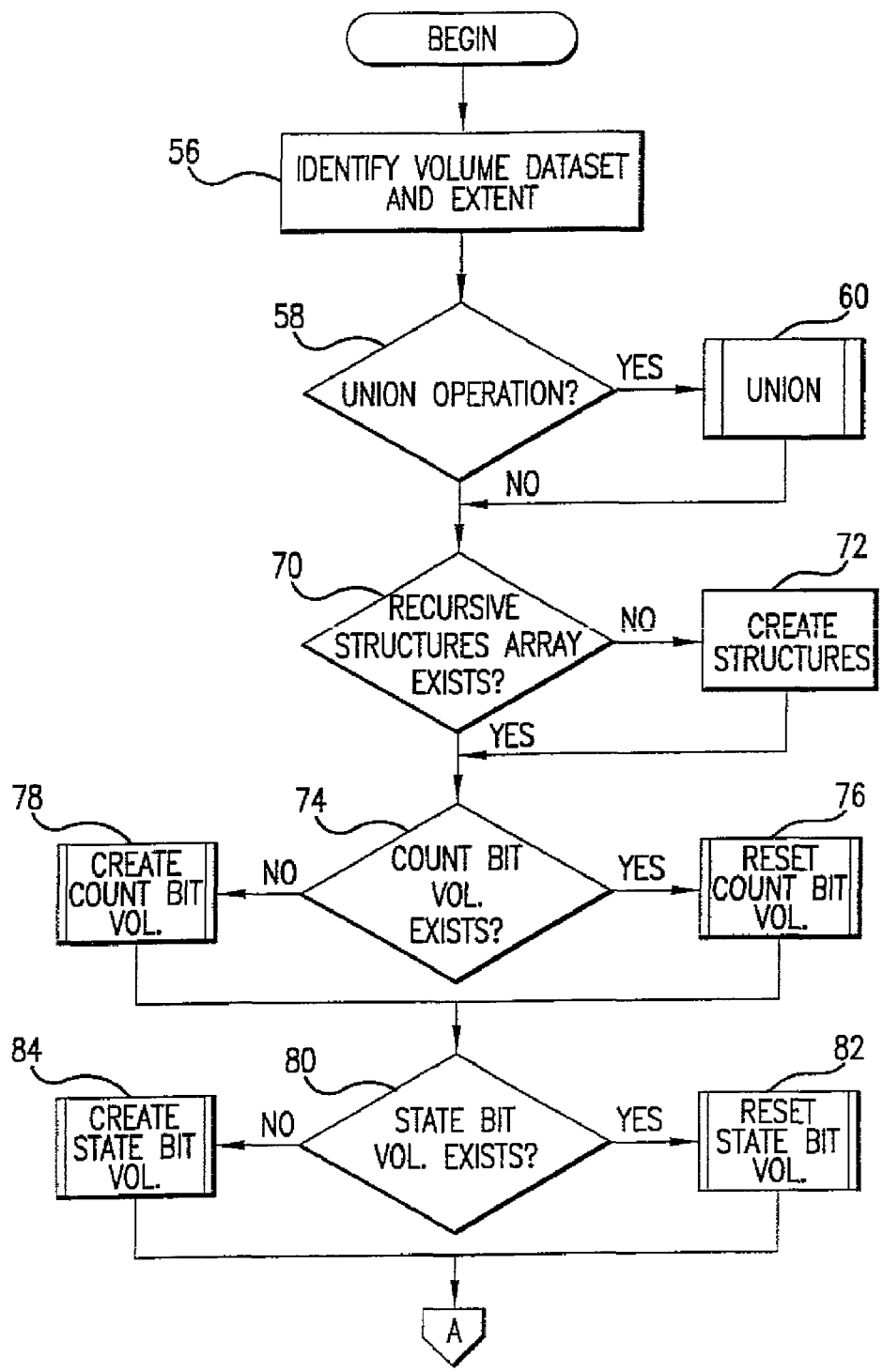
FIG. 3A is a flowchart of the segmentation or pre-processing step of FIG. 2.
Figure 3B:
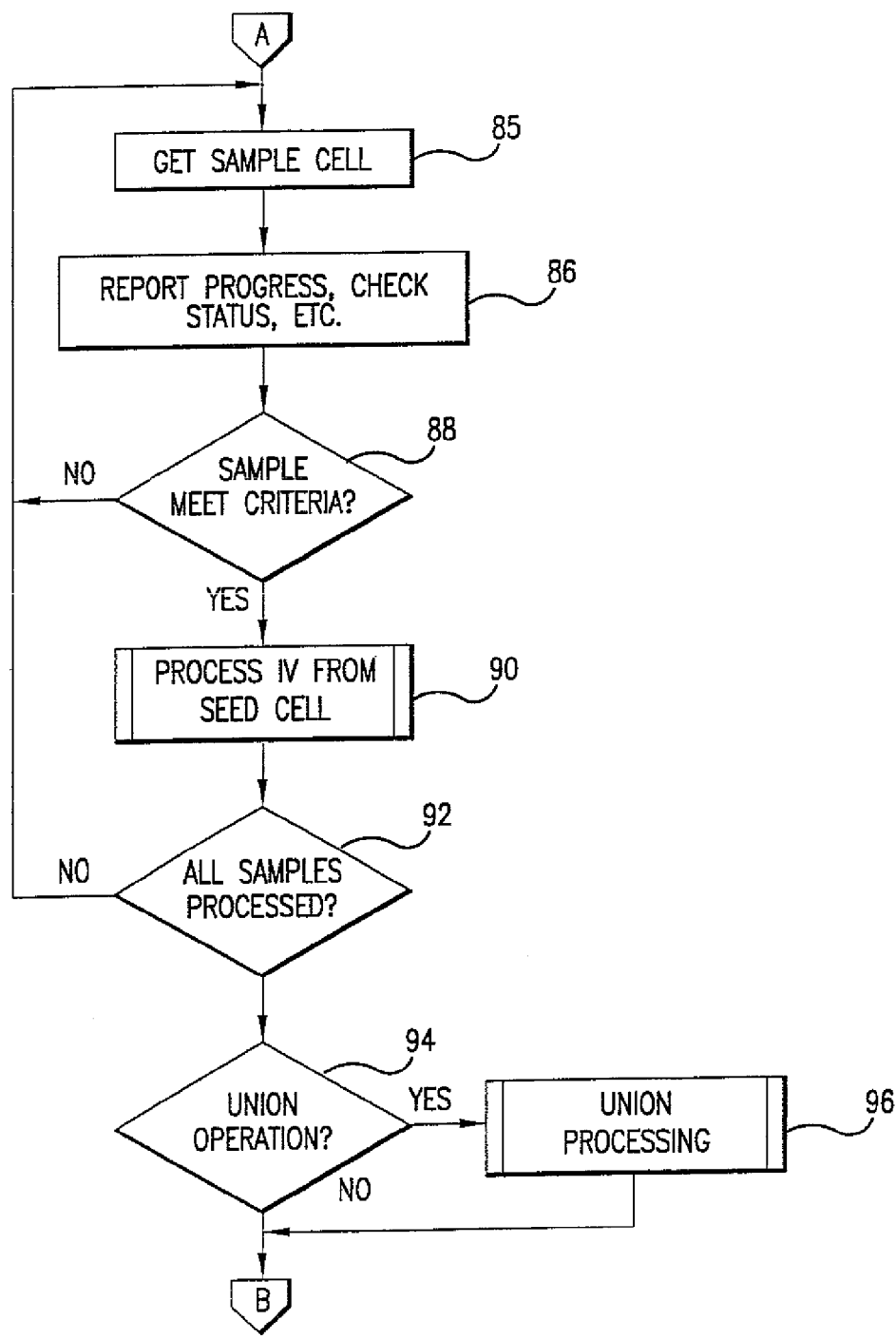
FIG. 3B is continuation of FIG. 3A.
Figure 3C:
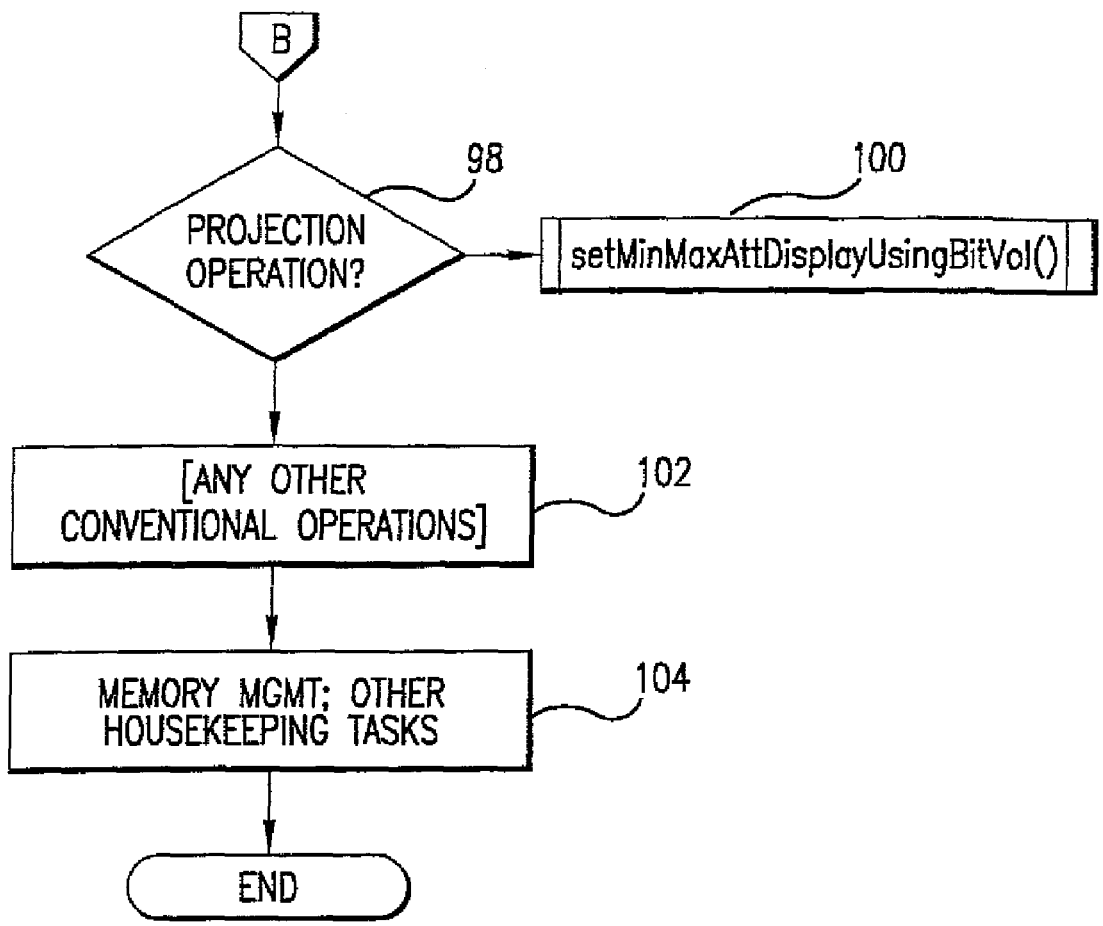
FIG. 3C is a continuation of FIGS. 3A-B.
Figure 3D:
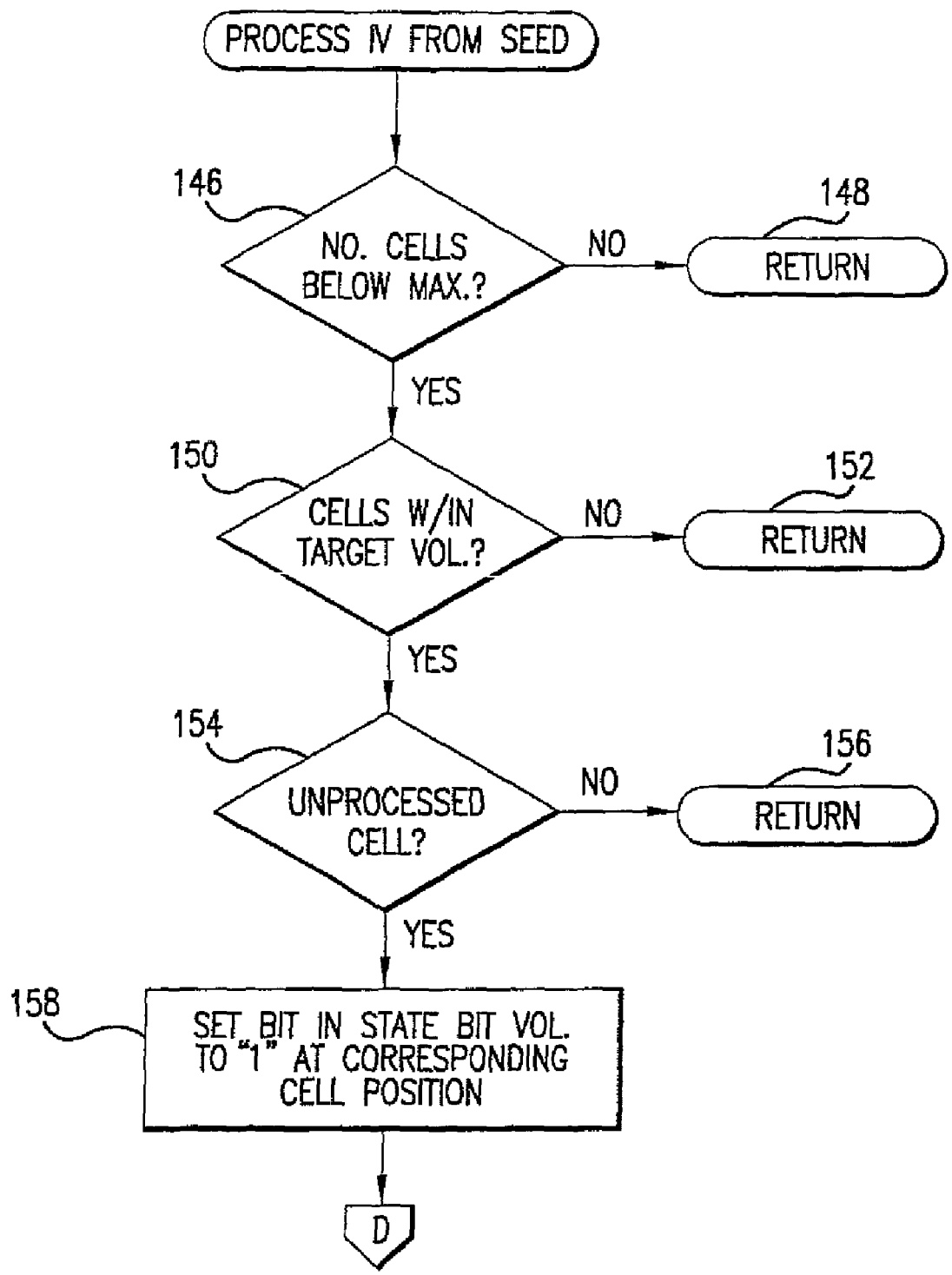
FIG. 3D is a continuation of FIGS. 3A-C.
Figure 3E:
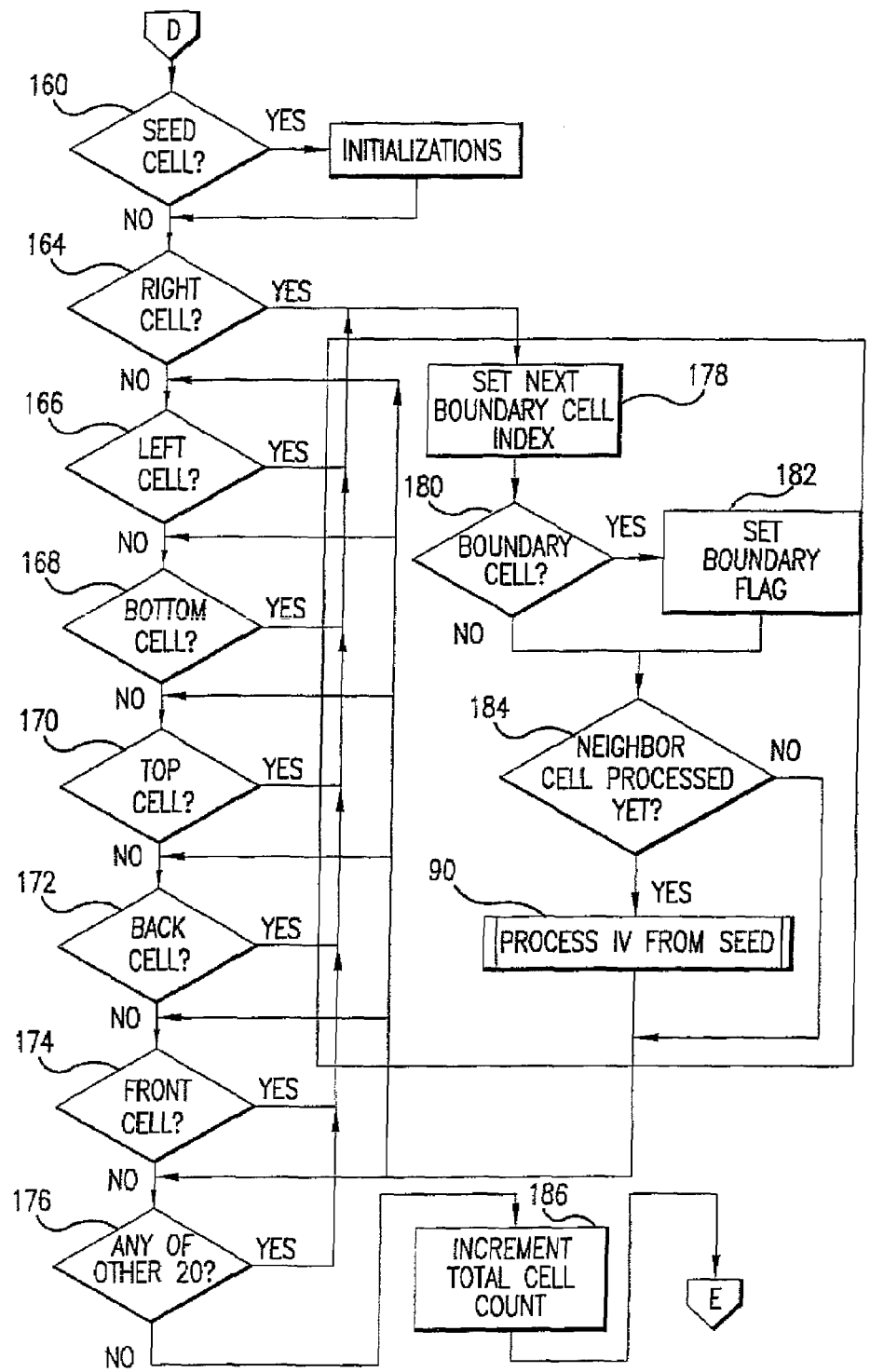
FIG. 3E is a continuation of FIGS. 3A-D.
Figure 3F:
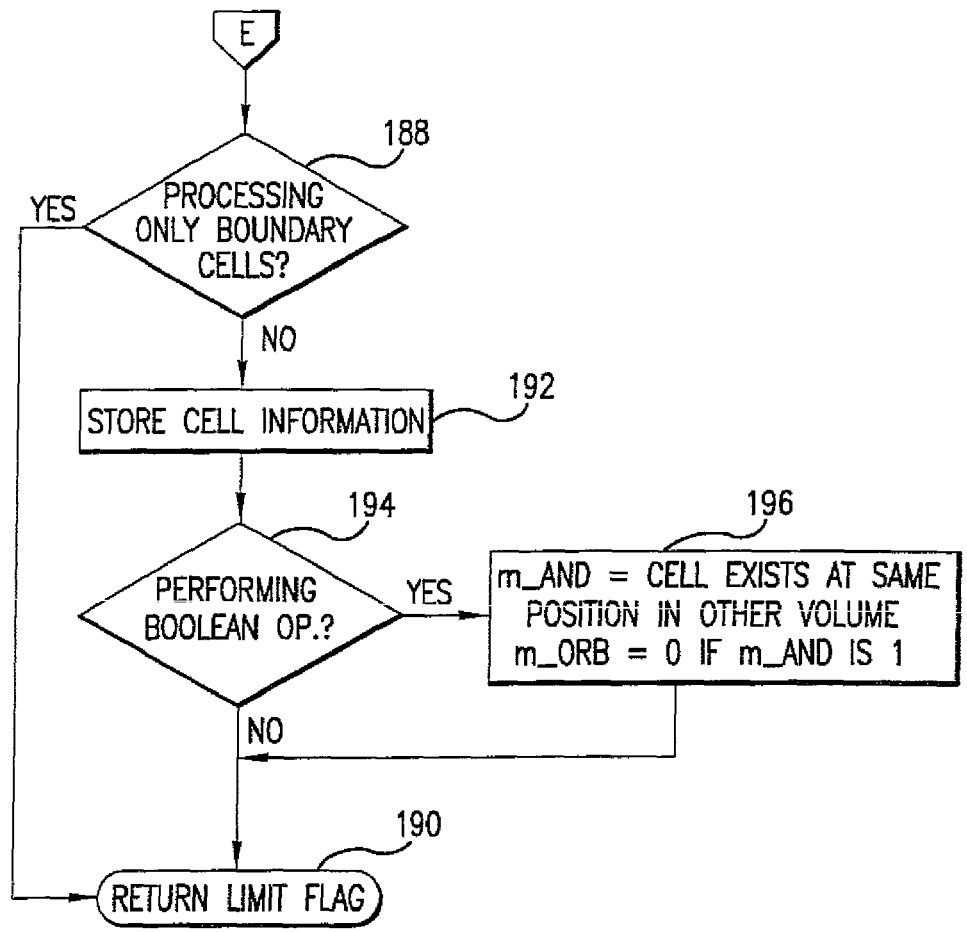
FIG. 3F is a continuation of FIGS. 3A-E.
Figure 3G:
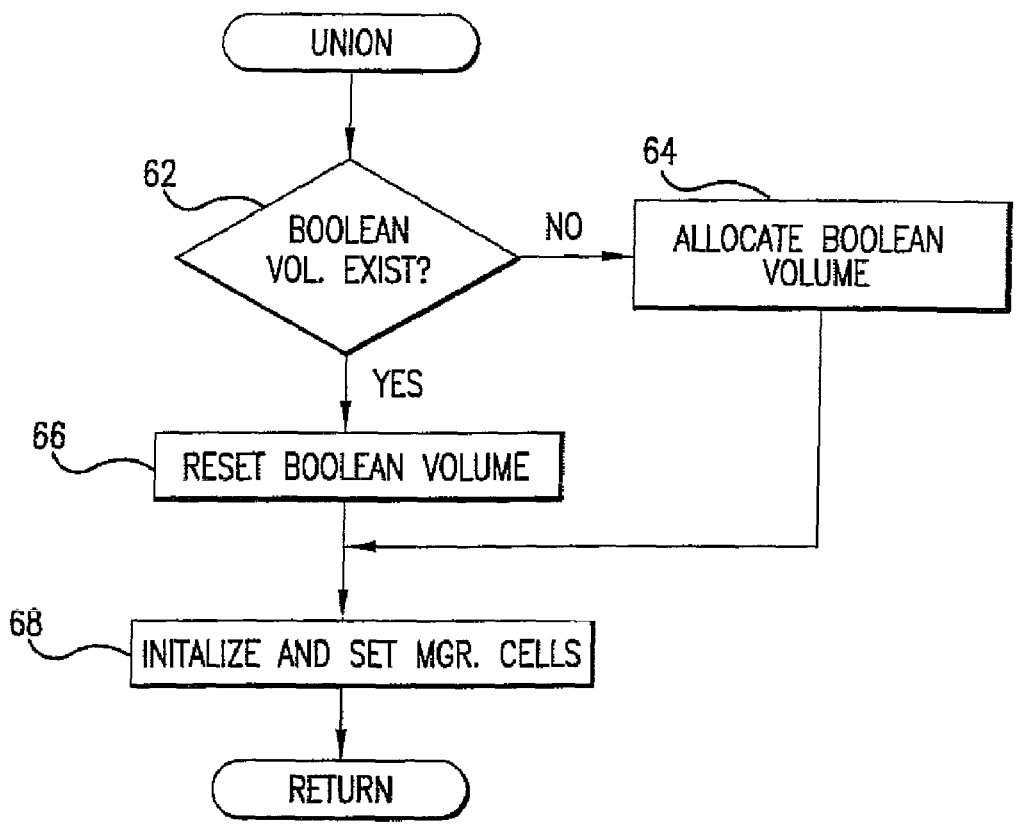
FIG. 3G is a continuation of FIGS. 3A-F.
Figure 3H:
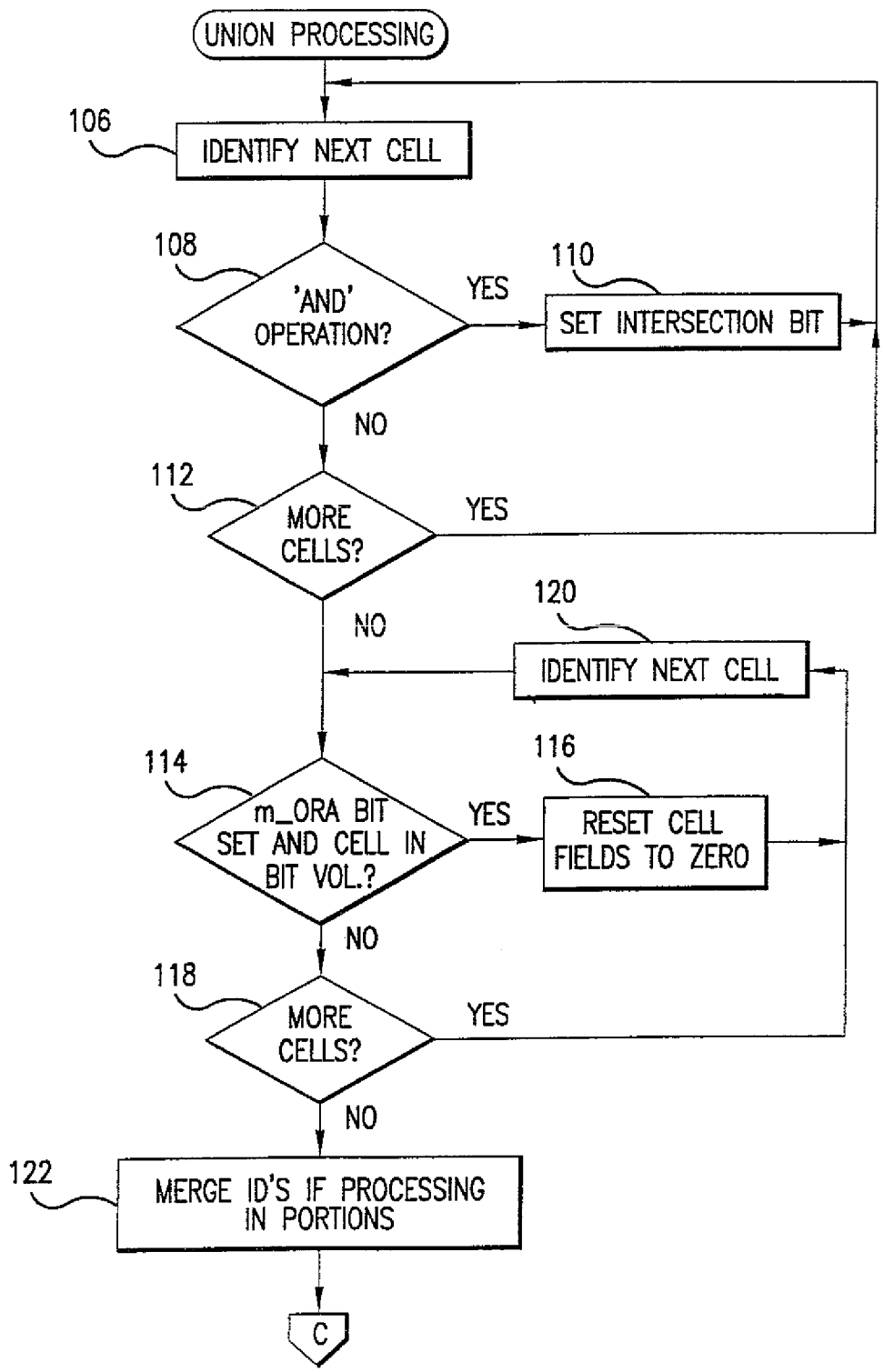
FIG. 3H is a continuation of FIGS. 3A-G.
Figure 31:
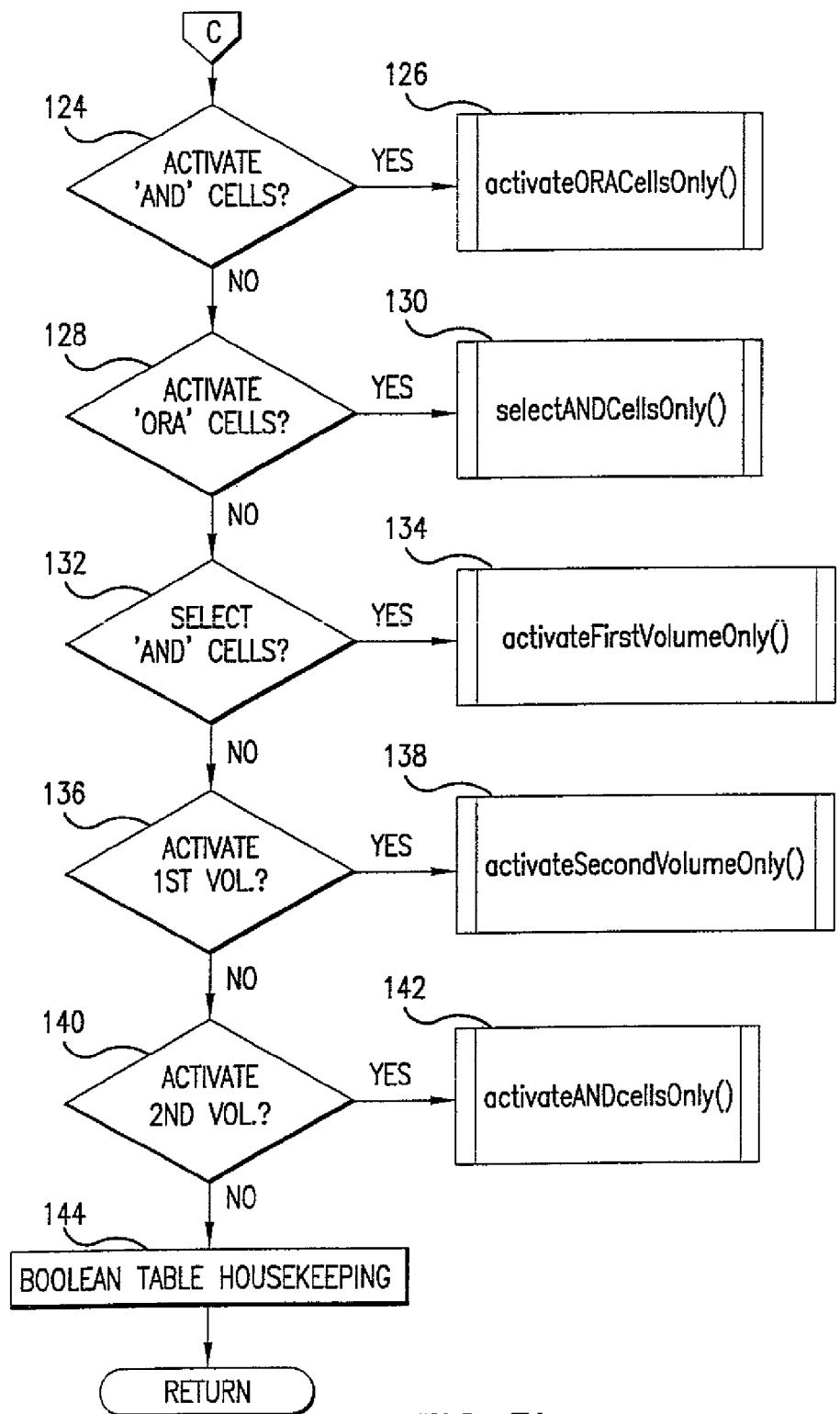

The union processing of step 96 is illustrated in FIG. 3H-I. At step 106 the next cell to process in the selected IV is identified and the corresponding data structure in the Boolean volume is examined. For example, at step 108 it is determined whether the "AND" bit in the data structure is set, indicating that a Boolean operation is to be performed after processing, and all cells are thus to be marked accordingly to correctly correlate the proper processing cells. If it is set, then at step 110 the intersection bit in the corresponding location in the resulting volume, i.e., a volume that represents the results of the intersection, is set. If it is determined at step 112 that more cells in the selected IV are to be processed, processing returns to step 106. When all cells have been processed, it is determined at step 114 whether the m_ORA bit is set and the cell exists in the Boolean bit volume respective position. If it is set, at step 116 certain cell fields that are not of interest, i.e., not to be processed, are reset to zero. One such field can be a visibility/ACTIVE field that indicates whether the cell is activated, i.e., visible when rendered. Another can be a flag that is set when processing indicates that a cell is to be deleted but has not actually yet been removed. ORA is a field that indicates that there is only one cell at that spatial position at that moment. No other IV contains a cell in that position. This initialization is repeated for each cell, as indicated by steps 118 and 120. When all cells have been processed, at step 122 the IV identifiers are merged if the input dataset was processed in portions (i.e., by defining extents). Alternatively, in other embodiments of the invention the merging could occur at a later time or in some other manner, such as on a different computer.

At step 124 it is determined if the AND cells are activated, i.e., whether they are to be visible or not in the resulting IV when displayed. If they are activated, step 126 represents a suitable activation routine or method "activateORAcellsOnly". This routine isolates and marks all cells that are identified using the OR cell operation, which can be displayed for processing. At step 128 it is determined if the 'ORA' cells are activated, i.e., whether they are to be visible or not in the resulting IV when displayed. If they are activated, step 130 represents a suitable activation routine or method "selectANDcellsOnly". This routine identifies cells that meet a Boolean AND condition, which can be that two cells exist in two different IVs from one or more datasets or for later processing of cells that occupy the same spatial location. At step 132 it is determined if the AND cells are selected, i.e., whether they are to be displayed in a distinctive color when the resulting IV is displayed. If they are selected, step 134 represents a suitable routine or method isolating cells that exist only in the first volume. For example, cells are isolated if a Boolean AND operation is to be performed between two coexisting IVs, but it is desired to render only the common cells that exist only in the first IV. At step 136 it is determined if the first IV (of the two undergoing the union operation) is activated, i.e., whether the IV as a whole is to be visible or not in the resulting IV when displayed. If it is activated, step 138 represents a suitable routine or method for rendering only the marked cells that exist in the second IV. At step 140 it is determined if the second IV (the other the two undergoing the union operation) is activated, i.e., whether the IV as a whole is to be visible or not in the resulting IV when displayed. If it is activated, step 142 represents a suitable routine or method similar to that represented by step 130 but in which the cells are not uniquely marked with a selected color during rendering. Lastly, at step 144 some housekeeping tasks, such as deleting table information, reloading table information and deleting the temporary Boolean volume, are performed before processing returns to step 96 and continues at step 98 as described above.

The main recursive function called at step 90 is illustrated in FIGS. 3D-F. As noted above, this function extracts or identifies the rest of the cells belonging to the IV to which the seed cell belongs. If it is determined at step 146 that the number of then-counted cells of the current IV, i.e., the IV then undergoing processing, is not below some predetermined maximum, the function call is returned from at step 148, as this indicates an error or problem. If it is determined at step 150 that the current cell, i.e., the cell then undergoing processing, is not within the selected extent or sub-volume, the function call is returned from at step 152, as this indicates an error or problem. If it is determined at step 154 that the current cell has already been processed (by a previous recursive call), then the function call is returned from at step 156. As noted above, the state bit indicates whether a cell has been processed. If none of these conditions result in returning from the function call early, processing continues at step 158, where the state bit at the corresponding cell position in the State Bit Volume is set.

If it is determined at step 160 that the current cell is a seed cell, then because it is the first cell of the IV being processed a Total Body Count, which is the total number of internal and external cells, is set to zero in an IV table. The IV table is used to maintain object information and statistics (but not information describing individual cells of the IV). The coordinates or location of the seed cell is stored in the table. The seed attribute is stored in the cell data structure, which contains all information relevant to each cell, such as position, normal, face information, and so forth. Storing information about the seed cell, including its location, is beneficial because it enables an IV to be extracted without having to search for a seed cell.

Steps 164, 166, 168, 170, 172 and 174 ask, respectively, whether a cell to the right, left, bottom, top, back and front of the current cell exists. Step 176 similarly asks if any of the other 20 neighbors of a cell exist, such as top-front-right, top-front-left, etc. Note that a cubic cell has a total of 26 neighbors. If any such neighboring cell exists, processing jumps to step 178 at which the boundary cell index, which is a flag indicating that the cell is located on the outer surface or skin of the IV, is set to the proper value. Then, if it is determined at step 180 that the current cell is a boundary cell, at step 182 a boundary flag is set to True, and the next offset is set. An offset is a value indicating how far the cell is located in a linear array representing the bit array or attribute array. That is, all bit volumes and data arrays have the same offset for a cell in a specific spatial position. Storing information that indicates whether a cell is a boundary cell enables the skin to be rendered quickly if a user desires to view only the voxel skin of an IV.

At step 184 it is determined whether the neighboring cell has been processed yet. The neighboring cell is that which is to the right, left, bottom, top, back or front of the current cell, depending on which of steps 154-174 returned a true result. If the neighboring cell has been processed, processing continues after the one of steps 154-174 that returned a true result. If the neighboring cell has not been processed, then the function indicated at step 90 and illustrated in these FIGS. 3D-F is called again. The function thus calls itself in a recursive manner until all cells belonging to the current IV have been identified and stored.

Each time the main recursive function returns, processing continues at step 186, where the total cell count of the current IV is incremented. Then, at step 188 it is determined whether the user has elected to process the entire IV or only its boundary cells. If only boundary cells, then at step 190 a limit flag is set, and the function returns again. A limit flag is a data field that maintains a count of the number of cells found. When the count reaches a predetermined maximum, then the limit flag is set, no more cells are processed, and the processing stops. If processing all cells, then at step 192 information describing the cell is stored in a cell data structure. One such data structure exists for each cell of each IV. Specifically, the information stored can include, among other things, the coordinates or location of the current cell, a cell body identifier that uniquely identifies the cell, an attribute value of the cell (e.g., amplitude), and neighborhood information. The attribute value is useful because one IV can be used as template to efficiently extract attribute values from other IVs. The neighborhood information is an encoded bit string that indicates where the current cells neighbors exist. For example, a bit is set to "1" if the current cell has a neighbor to its left, another bit is set to "1" if the current cell has a neighbor above it, and so forth. The polyhedron bit face visibility information matches and is inferred from the above information. For example, if a hexahedron (cube) is used, and if there is not a neighbor cell, above it, then that means that the top voxel cube's face will be visible, since it is facing the outside of the IV. If there is a neighbor facing the bottom of the cell, then the face visibility will be "off" for the bottom cube's face, since it faces the inside of the IV.

If it is determined at step 194 that a Boolean operation is being performed on the current IV then the cells from one or more IVs are compared at step 196, and their data structure fields are updated for proper rendering. For example, if one desires all the common cells, then the m_AND field of all the AND cells will be set to "1". The function call then returns at step 190.

Note that when the very first of the recursive function calls returns, processing continues from step 90. As described above, the processing that follows step 90 can include not only displaying the IVs that have been identified and stored but also union operations, projection operations and any other operations with which persons skilled in the art are familiar because all of the information necessary to perform such operations in a straightforward manner has been stored in the data structures. Although such conventional operations can be performed using any suitable algorithms or methods, note that the operation of rendering an image can be performed using the novel rendering method described above with regard to step 38 (FIG. 2).

A unique characteristic of the above-described algorithm is that all the rendering geometry need only be calculated once. Prior voxel/pseudo-voxel algorithms known in the art, such ray casting, splatting, and texture-based rendering schemes, must recalculate their geometry every time a frame is to be rendered and/or when the rendering view direction changes. In addition, the novel algorithm voxel primitive described above facilitates economically providing a true 3D hardware voxel primitive using conventional, commercially available 3D hardware.

It should also be noted that by breaking the entire volume into spatially atomic components (irregular volumes), data can be easily divided into groups in order to balance the system execution and rendering performance on multi-pipe and multi-threaded systems. In comparison, other algorithms have to perform complicated data management schemes and perform various types of computations every time they render a frame and/or every time the rendering view direction changes.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for identifying irregular volumes represented within volumetric input data, comprising the steps of:
    inputting one or more volume datasets comprising a multiplicity of three-dimensional cells;
    establishing criteria describing properties of an irregular volume of interest;
    processing each volume dataset, the processing comprising the steps of:
        traversing from cell to cell of the volume dataset until a seed cell is identified having properties matching the criteria, the identified seed cell thereby belonging to an identified irregular volume;
        identifying cells related to the seed cell by a predetermined relationship as belonging to the identified irregular volume; and
        storing in a data structure associated with each identified cell belonging to the identified irregular volume, attribute data describing properties of the identified cell;
    selecting an identified irregular volume;
    transforming each cell of the irregular volume that is selected into a polyhedral voxel representation, representation including a face string having a plurality of bits, and a position string having a plurality of bits, each bit of the face string corresponding to one face of the polyhedral voxel and having a value indicating whether the face is to be displayed, the position string having a value indicating a three-dimensional spatial position of the polyhedral voxel; and
    rendering the representation of each polyhedral voxel, the face string for at least one polyhedral voxel representation having a bit with a value indicating at least one face is to be displayed for an internal cell.

2. The method claimed in claim 1, wherein the rendering step comprises the steps of:
    transforming each face to be displayed into a primitive selected from the group consisting of: point, line and polygon; and
    providing the primitives to a graphics engine.

3. A computer program product for identifying irregular volumes represented within volumetric input data, comprising a non-transitory computer-usable data medium carrying thereon a:
    means for inputting one or more volume datasets comprising a multiplicity of three-dimensional cells;
    means for establishing criteria describing properties of an irregular volume of interest;
    means for processing each volume dataset, the processing comprising the steps of:
        traversing from cell to cell of the volume dataset until a seed cell is identified having properties matching the criteria, the identified seed cell thereby belonging to an identified irregular volume;
        identifying cells related to the seed cell by a predetermined relationship as belonging to the identified irregular volume; and
        storing in a data structure associated with each identified cell belonging to the identified irregular volume attribute data describing properties of the identified cell;

means for selecting an identified irregular volume;

means for transforming each cell of the irregular volume that is selected into a polyhedral voxel representation, representation including a face string having a plurality of bits, and a position string having a plurality of bits, each bit of the face string corresponding to one face of the polyhedral voxel and having a value indicating whether the face is to be displayed, the position string having a value indicating a three-dimensional spatial position of the polyhedral voxel; and means for rendering the representation of each polyhedral voxel, the face string for at least one polyhedral voxel representation having a bit with a value indicating at least one face is to be displayed for an internal cell.

4. The computer program product claimed in claim 3, wherein the means for rendering comprises a:

means for transforming each face to be displayed into a primitive selected from the group consisting of point, line and polygon; and means for providing the primitives to a graphics engine.

5. A method for voxel-encoding a volume dataset comprising a multiplicity of cells, comprising the steps of:

defining a multiplicity of polyhedral voxels, each polyhedral voxel corresponding to one cell;

storing a representation of each polyhedral voxel, the representation including a face string having a plurality of bits, and a position string having a having a plurality of bits, each bit of the face string corresponding to one face of the polyhedral voxel and having a value indicating whether the face is to be displayed, the position string having a value indicating a three-dimensional spatial position of the polyhedral voxel; and rendering the representation of each polyhedral voxel, the face string for at least one polyhedral voxel representation having a bit with a value indicating at least one face is to be displayed for an internal cell.

6. The method claimed in claim 5, wherein the step of rendering the representation of each polyhedral voxel comprises transforming each face or voxel to be displayed into a primitive selected from the group consisting of point, line and polygon.

7. The method claimed in claim 5, wherein the representation of each polyhedral voxel stored in a memory further includes a bit indicating whether the voxel is selected,

8. The method claimed in claim 5, wherein the representation of each polyhedral voxel stored in a memory further includes a normal string having a value indicating shading of each face to be displayed.

9. The method claimed in claim 5, wherein:

each polyhedral voxel is represented in a cube having six faces; and each bit of the face string has a value indicating whether the face is to be displayed.

10. The method claimed in claim 9, further comprising:

the step of transforming each face to be displayed into a primitive by dividing each face into two triangles.

11. A computer program product for voxel-encoding a volume dataset comprising a multiplicity of cells, comprising a non-transitory computer-usable medium carrying thereon a:

means for defining a multiplicity of polyhedral voxels, each polyhedral voxel corresponding to one cell;

means for storing a representation of each polyhedral voxel, the representation including a face string having a plurality of bits, and a position string having a plurality of bits, each bit of the face string corresponding to one face of the polyhedral voxel and having a value indicating whether the face is to be displayed, the position string having a value indicating a three-dimensional spatial position of the polyhedral voxel; and means for rendering the representation of each polyhedral voxel, the face string for at least one polyhedral voxel representation having a bit with a value indicating at least one face is to be displayed for an internal cell.

12. The computer program product claimed in claim 11, wherein the means for rendering the representation of each polyhedral voxel comprises a means for transforming each face to be displayed into a primitive selected from the group consisting of: point, line and polygon.

13. The computer program product claimed in claim 11, wherein the representation of each polyhedral voxel stored in a computer memory further includes a bit indicating whether the voxel is selected.

14. The computer program product claimed in claim 11, wherein the representation of each polyhedral voxel stored in a computer memory further includes a normal string having a value indicating shading of each face to be displayed.

15. The computer program product claimed in claim 11, wherein:

each polyhedral voxel is represented as a cube having six faces; and each bit of the face string has a value indicating whether the face is to be displayed.

16. The computer program product claimed in claim 15, further comprising a:

means for transforming each face to be displayed into a primitive by dividing each face into two triangles.

* * * * *